US011808661B1

(12) United States Patent
Wladkowski (10) Patent No.: US 11,808,661 B1
(45) Date of Patent: Nov. 7, 2023

(54) APPARATUSES AND METHODS FOR ANALYZING MULTIPLE OPTICAL SIGNALS IN PARALLEL

(71) Applicant: Intel Corporation, Santa Clara, CA (US)

(72) Inventor: Henry Wladkowski, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/737,067

(22) Filed: May 5, 2022

(51) Int. Cl.
G01M 11/00 (2006.01)

(52) U.S. Cl.
CPC ........ G01M 11/334 (2013.01); G01M 11/333 (2013.01)

(58) Field of Classification Search
CPC .... G01M 11/30; G01M 11/33; G01M 11/331; G01M 11/332; G01M 11/333; G01M 11/334; G01M 11/335; G01M 11/336; G01M 11/337; G01M 11/338
See application file for complete search history.

(56) References Cited

U.S. PATENT DOCUMENTS

| | | | |
|---|---|---|---|
| 2,997,699 A | | 8/1961 | Lovell |
| 3,944,362 A | * | 3/1976 | Dailey ................. G03B 27/735 355/1 |
| 4,624,562 A | * | 11/1986 | Buck ...................... G01M 11/35 356/73.1 |
| 9,476,795 B1 | * | 10/2016 | Cogger ................ G02B 6/3895 |

FOREIGN PATENT DOCUMENTS

JP H10243278 A * 9/1998

OTHER PUBLICATIONS

Futia, G. et al., "Spatially-chirped modulation imaging of absorption and fluorescent objects on single-element optical detector", Optics Express, Jan. 17, 2011, pp. 1626-1640, vol. 19, No. 2, Optical Society of America.

* cited by examiner

Primary Examiner — Gordon J Stock, Jr.
(74) Attorney, Agent, or Firm — VIERING,JENTSCHURA&PARTNER mbB (57) ABSTRACT

An apparatus includes optical fiber ports into which optical fiber channels are input, the optical fiber channels carrying and outputting light, a mask configured to, while spinning at a frequency, allow a first portion of the light incident on the mask to pass through the mask, and block a remaining portion of the light incident on the mask, based on a pattern on the mask, and a photodetector configured to detect the allowed first portion of the light as input signals. The apparatus further includes a testing device configured to transform the input signals to a frequency domain, to obtain measured signals in frequencies respectively corresponding to the optical fiber channels, and determine whether each of the measured signals is a failure by comparing the obtained measured signals with a threshold signal.

20 Claims, 6 Drawing Sheets

APPARATUSES AND METHODS FOR ANALYZING MULTIPLE OPTICAL SIGNALS IN PARALLEL

STATEMENT REGARDING FEDERALLY SPONSORED RESEARCH OR DEVELOPMENT

This invention was made with Government support under Agreement No. HR0011-19-3-0003, awarded by DARPA. The Government has certain rights in the invention.

BACKGROUND

Optical signal strength from an increasing number of optical fibers determines connection quality. Stepping through all these fibers serially, even at a rate of 20 milliseconds (ms) per fiber, takes increasing amounts of time and involves buying new equipment when existing capacities are exceeded.

Multi-channel optical fiber switches can control a signal input or output of an optical connection, but investigating each input and output combination serially with moving parts can take 20-300 ms to move and stabilize. This is regardless of the size or portability of a switch. Measuring tens or hundreds of input or output fibers per connection adds up to minutes per measured connection. Each optical switch can only accommodate so many fibers, and when that number is exceeded, additional optical switches need to be purchased to measure connection quality. Imaging a fiber optic array with a camera is possible, but suffers from aliasing effects due to pixel boundaries and sizes, particularly with regards to small fiber pitches.

Spatially varying frequency systems can identify separate light sources within an image by tying their modulation frequency to location, allowing single pixel image collection that is recoverable by fast Fourier transform (FFT). However, these systems are still under development with no standards applied to measuring fiber optic arrays.

BRIEF DESCRIPTION OF THE DRAWINGS

In the drawings, like reference characters generally refer to the same parts throughout the different views. The drawings are not necessarily to scale, emphasis instead generally being placed upon illustrating the present disclosure. The dimensions of the various features or elements may be arbitrarily principles expanded or reduced for clarity. In the following description, various aspects of the present disclosure are described with reference to the following drawings, in which.

DETAILED DESCRIPTION

The following detailed description refers to the accompanying drawings that show, by way of illustration, specific details and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

The present disclosure relates to apparatuses and methods for analyzing multiple optical signals in parallel.

A present apparatus may include optical fiber ports into which optical fiber channels are input, the optical fiber channels carrying and outputting light, a mask configured to, while spinning at a frequency, allow a first portion of the light incident on the mask to pass through the mask, and block a remaining portion of the light incident on the mask, based on a pattern on the mask, and a photodetector configured to detect the allowed first portion of the light as input signals. The apparatus may further include a testing device configured to transform the input signals to a frequency domain, to obtain measured signals in frequencies respectively corresponding to the optical fiber channels, and determine whether each of the measured signals is a failure by comparing the obtained measured signals with a threshold signal.

In another aspect, a method pursuant to the present disclosure may include controlling a mask to spin at a frequency, the mask allowing a first portion of light incident on the mask to pass through the mask, and blocking a remaining portion of the light incident on the mask, based on a pattern on the mask, the light being carried and output by optical fiber channels input into optical fiber ports, and detecting, via a photodetector, the allowed first portion of the light as input signals. The method may further include transforming the input signals to a frequency domain, to obtain measured signals in frequencies respectively corresponding to the optical fiber channels, and determining whether each of the measured signals is a failure by comparing the obtained measured signals with a threshold signal.

In yet another aspect, a non-transitory computer-readable medium may include instructions, which, if executed by a processor, cause the processor to control a mask to spin at a frequency, the mask allowing a first portion of light incident on the mask to pass through the mask, and blocking a remaining portion of the light incident on the mask, based on a pattern on the mask, the light being carried and output by optical fiber channels input into optical fiber ports, and detect, via a photodetector, the allowed first portion of the light as input signals. The instructions, which, if executed by the processor, may further cause the processor to transform the input signals to a frequency domain, to obtain measured signals in frequencies respectively corresponding to the optical fiber channels, and determine whether each of the measured signals is a failure by comparing the obtained measured signals with a threshold signal.

The above aspects may include passing light from each optical fiber through a spatially varying frequency mask to modulate each optical fiber channel with a distinct frequency. A single element high-speed detector may collect light from all optical fibers, each modulated with a distinct frequency. Collected time-varying signals may be fast Fourier-transformed into frequency signals, in which distinct peaks corresponding to each modulation frequency can be measured and compared to determine connection quality for each optical fiber channel.

Advantageously, connection quality information can be collected for each optical fiber channel simultaneously within 15 ms, allowing for real-time feedback. An overall number of optical fiber channels can be increased or decreased as needed up to approximately 512 channels without purchase of multiple expensive optical switches. The above aspects may also be flexible, with additional insertions of polarization controllers, active alignment systems, different connector combinations, different fiber pitches, and/or different frequency mask patterns to accommodate additional channels. With proper connectivity, the above aspects can measure both transmitted and reflected light. Signal quality detection can be improved by different or updated software algorithms.

Figure 1:
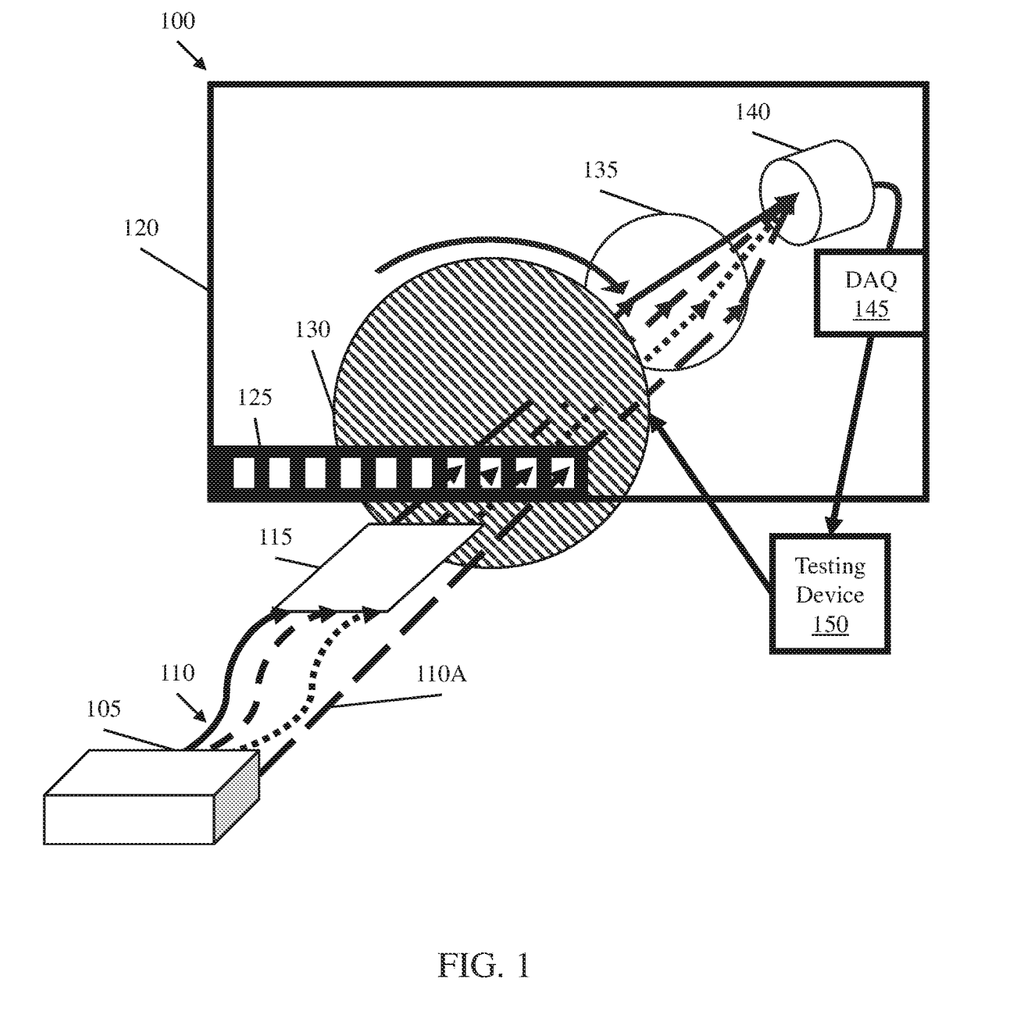
FIG. 1 is a diagram of a system for analyzing multiple optical signals in parallel, according to aspects of the present disclosure.

FIG. 1 is a diagram of a system 100 for analyzing multiple optical signals in parallel, according to aspects of the present disclosure.

Referring to FIG. 1, the system 100 includes a light source 105, optical fiber channels 110, a sample test bed 115, and an apparatus 120 for analyzing multiple optical signals in parallel. The apparatus 120 includes an enclosure (e.g., a wall mount box) that houses optical fiber ports 125, a spatially varying frequency mask 130, a focusing optic 135, and a single channel fast photodetector 140. The apparatus 120 may further include a data acquisition (DAQ) device 145 and a testing device 150, but this is only an example as the DAQ device 145 and the testing device 150 may be disposed external to the apparatus 120.

The light source 105 emits light into the optical fiber channels 110 from a multiway fiber splitter. For example, the light source 105 may include a light source at a proper wavelength for the optical fiber channels 110, a class 1 or class 2 laser or a more extensive laser system.

The optical fiber channels 110 carry the emitted light, and are shown in different dash patterns for clarity. The optical fiber channels 110 appear before and after the sample test bed 115. An optical fiber channel 110A among the optical fiber channels 110 carries an input reference power, bypasses the sample test bed 115 and is directly input or connected into one of the optical fiber ports 125.

The sample test bed 115 that the carried light passes through may hold a transmissive optical fiber device, a reflective optical fiber device, or an optical connector under test that directly connects both portions of the optical fiber channels 110 before and after and the sample test bed 115, for a reference measurement. The sample test bed may accommodate multiple optical connectors at once in either transmission or reflection modes and orientations. For example, the sample test bed 115 may include a flat surface or a fixture such as a spare block or a three-dimensional (3D) printed part.

The optical fiber ports 125 represent a portion of (e.g., 512) supported optical fiber ports into which the optical fiber channels 110 are input or connected. All of the optical fiber ports 125 may come together to a 0.1 mm fiber pitch that is input into the spatially varying frequency mask 130 regardless of a fiber pitch of the sample test bed 115; here only active frequency channels are indicated. The light carried by the optical fiber channels 110 and passed through the sample test bed 115 is output at the optical fiber ports 125 and incident onto the mask 130. The optical fiber channel 110A carrying the input reference power is also input or connected into the optical fiber ports 125, as, e.g., a $513^{th}$ frequency channel, and light corresponding to the input reference power may be output at the optical fiber ports 125 and incident onto the mask 130.

Figure 2:
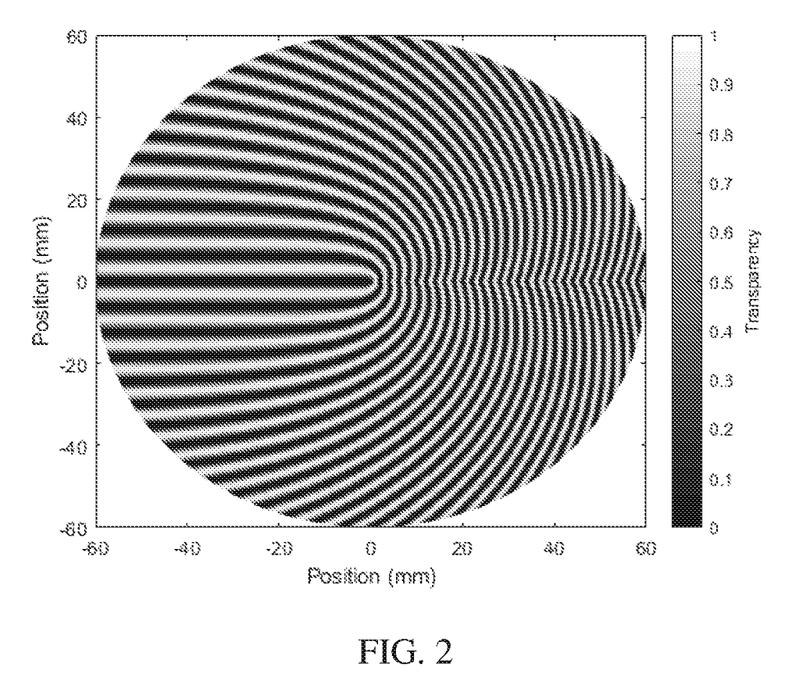
FIG. 2 is a graph of transparencies at positions of a spatially varying frequency mask of FIG. 1, according to aspects of the present disclosure.

The spatially varying frequency mask 130 modulates the incident light by allowing a first portion of the incident light through the mask 130 and blocking a remaining portion of the incident light, based on a pattern on the mask 130. An example of the pattern on the mask 130 is shown in FIG. 2. The pattern on the mask 130 is configured to determine a minimum supported signal pitch incident on the mask 130 and a maximum number of distinguishable signal channels passable through the mask. The mask 130 may be made of a plastic or a metal stencil, and may be made by, for example, a laser etching tool. The mask 130 modulates the incident light while being spun by a chopper motor or similar motor (not shown) at a fixed, regulated frequency. Thus, a material of the mask 130 is uniform, as the mask 130 may spin quickly and being unbalanced can spin the mask 130 apart.

The focusing optic 135 focuses the modulated light onto the single channel fast photodetector 140. For example, the focusing optic 135 may include a focusing lens for wavelengths that are used in the system 100.

The single channel fast photodetector 140 detects the focused light as input signals for the DAQ device 145. The photodetector 140 having nanosecond (ns) response times may be more than fast enough for many situations. For example, the photodetector 140 may include a single, fast photodiode or photomultiplier tube. A transimpedance gain amplifier (not shown) may be used after the photodetector 140 to transform the input signals into voltage signals for the DAQ device 145.

The DAQ device 145 with an input throughput of, e.g., 500 kilohertz (kHz) converts the input signals from the single channel fast photodetector 140 into digital output signals for computer analysis in the testing device 150. The DAQ device 145 may accommodate mask rotation frequencies up to around 137 Hz.

The testing device 150 receives the digital output signals, and performs an FFT on the received digital output signals to obtain measured signals in a frequency space of, e.g., 512 channels. Each channel corresponds to one of the optical fiber channels 110, and has a frequency peak. Even though all channels have the same input power, amplitudes of their measured signals are not equivalent, which will be further described with respect to FIG. 3.

Figure 4:
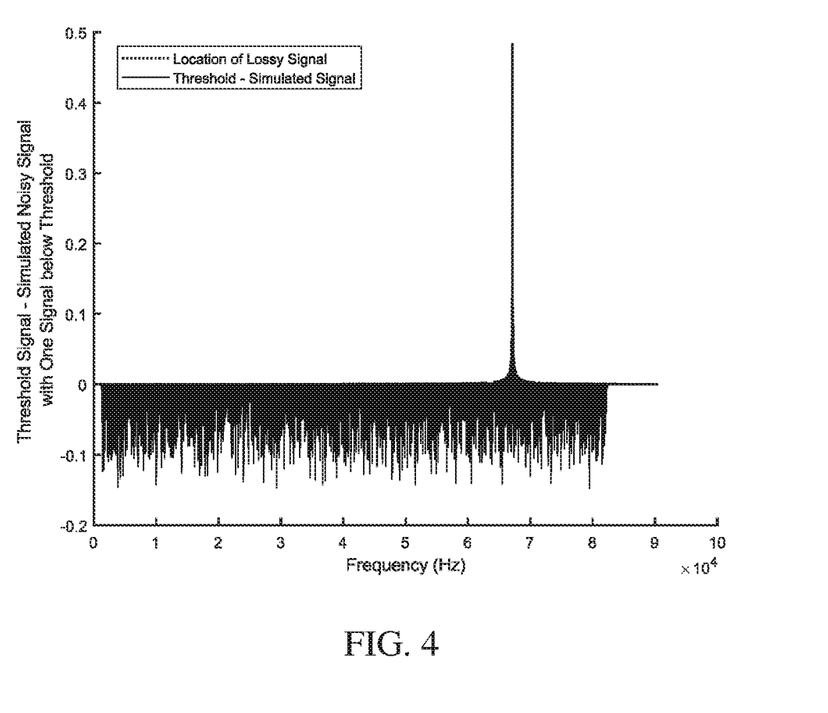
FIG. 4 is a graph of signal amplitudes of a threshold signal subtracted by the measured signals of FIG. 3 in the frequency space, according to aspects of the present disclosure.

However, a drop in any channel can be measured when compared to a full power amplitude, allowing for low (failure) signal identification, which will be further described with respect to FIG. 4. In detail, the testing device 150 determines whether each of the measured signals is a failure by comparing the measured signals with a threshold signal. The testing device 150 subtracts the measured signals from the threshold signal, to obtain difference signals. Portions of the measured signals stronger than the threshold signal result in difference signals that are negative in value, while portions of the measured signals weaker than the threshold signal result in difference signals that are positive in value and are detected as failures for respective frequency channels.

For example, the testing device 150 may include a computer that can perform the FFT and the comparing of the measured signal with the threshold signal.

The testing device 150 may further determine the threshold signal, based on a simulated signal that is scaled by the input reference power adjusted by an amount of loss desired for a threshold. In detail, the testing device 150 is told a specific frequency channel (e.g., the 513th frequency channel) is a reference channel (e.g., corresponds to the input reference power) out of a set of expected channels X at frequencies Y. The simulated signal is obtained from the measured signals, using this reference channel, and then is scaled to the measured signals by the peak at the reference channel to obtain the threshold signal.

FIG. 2 is a graph of transparencies at positions of the spatially varying frequency mask 130 of FIG. 1, according to aspects of the present disclosure.

Referring to FIG. 2, the spatially varying frequency mask 130 may have a Lovell pattern. Axes of the graph are spatial extent in millimeters (mm). The Lovell pattern supports up to 60 channels; other patterns supporting more than 591 channels are possible. For clarity only, using 512 channels maximum is recommended, though with proper implementation that number can be increased. Input fiber pitch limits are determined by these patterns, but in the 591-channel pattern, an input fiber pitch can be 0.1 mm. This is independent of a sample fiber pitch, which only impacts the sample test bed 115 in FIG. 1.

Figure 3:
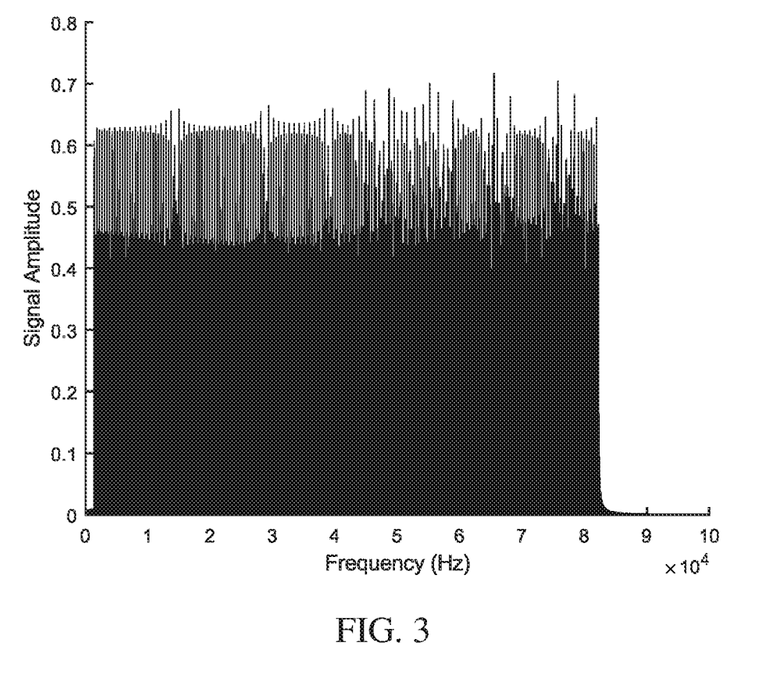
FIG. 3 is a graph of signal amplitudes of measured signals in a frequency space, according to aspects of the present disclosure.

FIG. 3 is a graph of signal amplitudes of measured signals in a frequency space, according to aspects of the present disclosure.

Referring to FIG. 3, in detail, the measured signals are FFTs of digital output signals from 591 input frequency channels incident onto the spatially varying frequency mask 130 capable of supporting more than 591 frequency channels, demonstrating ample support for 512 frequency channels. The measured signals are generated from rotating the mask 130 at, e.g., 137 Hz over 2 revolutions for 14.6 ms.

Each frequency channel forms a distinct peak, though these peaks are not all the same size despite having the same incident power. At this scale, the peaks merge together into one forest. There are also low and high frequency tails that do not correspond to any incident signal and are significantly shorter yet still positive in amplitude.

FIG. 4 is a graph of signal amplitudes of a threshold signal subtracted by the measured signals of FIG. 3 in the frequency space, according to aspects of the present disclosure.

Referring to FIG. 4, in detail, the shown signal amplitudes are difference signals between the measured signals of FIG. 3 (e.g., simulated noisy signals) and an FFT of the low threshold signal in black, with the frequency of a single known low measured signal that is below the threshold signal highlighted as a dashed line. The dashed-line positive peak in the difference signal right at a frequency of a lossy signal, which can be detected by a threshold algorithm to identify a specific frequency channel. In this case, a detected frequency is 6.302 kHz, which corresponds to channel 36, 4.5 mm from a pattern center in FIG. 2.

Figure 5:
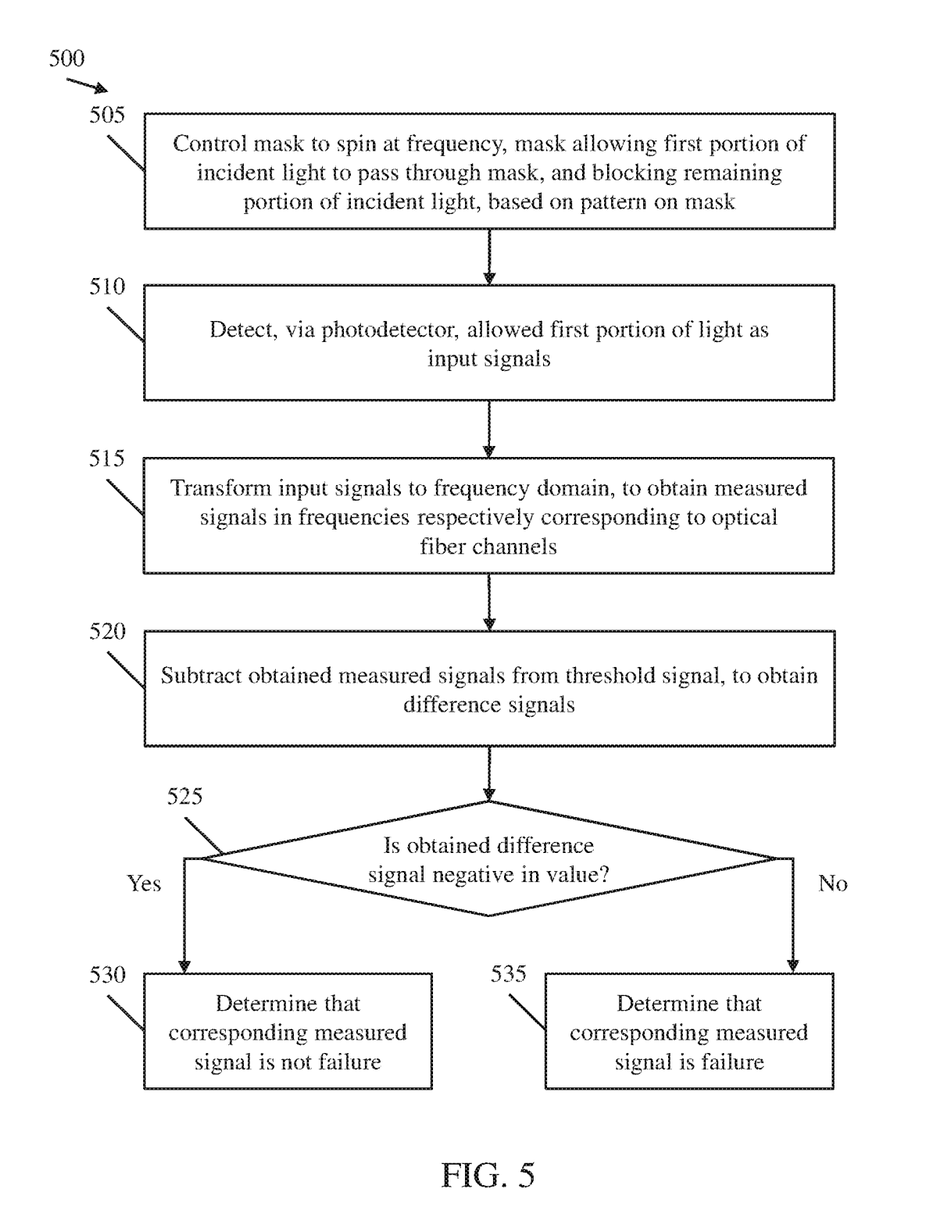
FIG. 5 is a flow diagram of a method of analyzing multiple optical signals in parallel, according to aspects of the present disclosure.

FIG. 5 is a flow diagram of a method 500 of analyzing multiple optical signals in parallel, according to aspects of the present disclosure.

Referring to FIG. 5, in operation 505, the method 500 includes controlling a mask to spin at a frequency, the mask allowing a first portion of light incident on the mask to pass through the mask, and blocking a remaining portion of the light incident on the mask, based on a pattern on the mask, the light being carried and output by optical fiber channels input into optical fiber ports.

In operation 510, the method 500 includes detecting, via a photodetector, the allowed first portion of the light as input signals.

In operation 515, the method 500 includes transforming the input signals to a frequency domain, to obtain measured signals in frequencies respectively corresponding to the optical fiber channels.

In operation 520, the method 500 includes subtracting the obtained measured signals from a threshold signal, to obtain difference signals.

In operation 525, the method 500 includes determining whether at least one of the obtained difference signals is negative in value.

Based on at least one of the obtained difference signals being determined to be negative in value (operation 525—Yes), in operation 530, the method 500 includes determining that at least one of the measured signals corresponding to the at least one of the obtained difference signals is not a failure.

Based on the at least one of the obtained difference signals being determined to be positive in value (operation 525—No), in operation 535, the method 500 includes determining that the at least one of the measured signals corresponding to the at least one of the obtained difference signals is a failure.

A focusing optic may focus the allowed first portion of the light onto the photodetector. The detecting the allowed first portion of the light may include detecting, via the photodetector, the focused first portion of the light as the input signals. The method 500 may further include converting the input signals from the photodetector into digital output signals, and the transforming the input signals may include performing an FFT on the digital output signals, to obtain the measured signals.

The pattern on the mask may determine a minimum signal pitch incident on the mask, and a maximum number of signal channels passable through the mask.

The method 500 may further include obtaining a simulated signal from the obtained measured signals, using a reference channel corresponding to an input reference power, among the frequencies, and scaling the obtained simulated signal by a peak at the reference channel, to obtain the threshold signal.

The methods and sequence of steps presented above are intended to be examples for analyzing multiple optical signals in parallel, according to aspects of the present disclosure. It will be apparent to those ordinary skilled practitioners that the foregoing process operations may be modified without departing from the spirit of the present disclosure.

Figure 6:
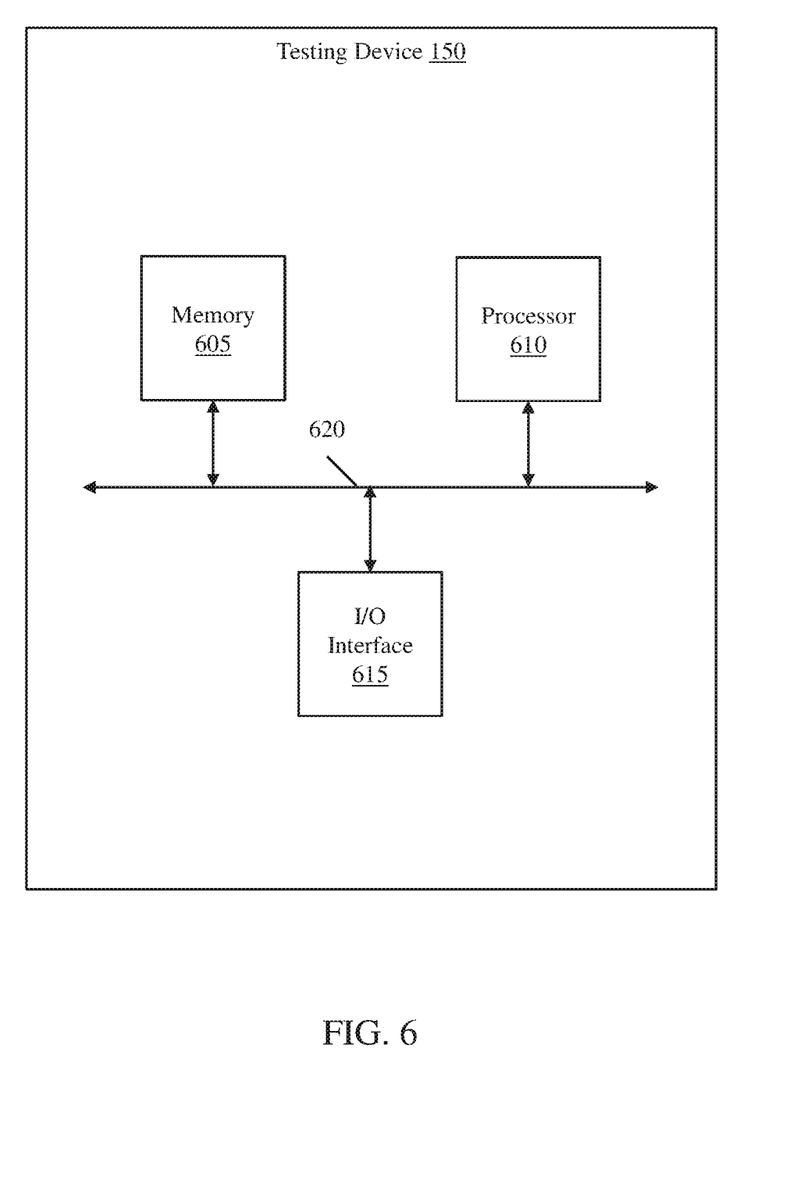
FIG. 6 is a block diagram of a testing device for performing the method of FIG. 5.

FIG. 6 is a block diagram of a testing device 150 for performing the method of FIG. 5.

Referring to FIG. 6, the testing device 600 may include a memory 605, a processor 610, an input/output (I/O) interface 615 and a bus 620.

The memory 605 may include a volatile and/or non-volatile memory. The memory 605 can store information, such as one or more of commands, data, programs (one or more instructions), applications, etc., which are related to at least one other component of the testing device 600 and for driving and controlling the testing device 600. For example, commands and/or data may formulate an operating system (OS). Information stored in the memory 605 can be executed by the processor 610. The memory 605 may store the information that is executed by the processor 610 to perform functions and operations described with respect to FIGS. 1-5 above.

The processor 610 may include one or more of a central processing unit (CPU), a graphics processor unit (GPU), an accelerated processing unit (APU), a many integrated core (MIC), a field-programmable gate array (FPGA), and/or a digital signal processor (DSP). The processor 610 can be a general-purpose controller that performs control of any one or any combination of the other components of the testing device 600, and/or performs an operation or data processing relating to communication. The processor 610 may execute one or more programs stored in the memory 605.

The I/O interface 615 may serve as a hardware and/or software interface that can, for example, transfer commands and/or data between a user, other external devices and/or other components of the testing device 600. The I/O interface 615 can further set up communication between the testing device 600 and an external testing device. The I/O interface 615 may be connected to a network through wireless or wired communication architecture to communicate with the external testing device. The I/O interface 615 may be a wired or wireless transceiver or any other component for transmitting and receiving signals.

The bus 620 may include a circuit for connecting the components 605, 610 and 615 with one another. The bus 620 functions as a communication system for transferring data between the components 605, 610 and 615 or between testing devices.

To more readily understand and put into practical effect the present apparatuses and methods, particular aspects will now be described by way of examples. For the sake of brevity, duplicate descriptions of features and properties may be omitted.

EXAMPLES

Example 1 provides an apparatus including optical fiber ports into which optical fiber channels are input, the optical fiber channels carrying and outputting light, a mask configured to, while spinning at a frequency, allow a first portion of the light incident on the mask to pass through the mask, and block a remaining portion of the light incident on the mask, based on a pattern on the mask, and a photodetector configured to detect the allowed first portion of the light as input signals. The apparatus further includes a testing device configured to transform the input signals to a frequency domain, to obtain measured signals in frequencies respectively corresponding to the optical fiber channels, and determine whether each of the measured signals is a failure by comparing the obtained measured signals with a threshold signal.

Example 2 may include the apparatus of example 1 and/or any other example disclosed herein, further including a focusing optic configured to focus the allowed first portion of the light onto the photodetector.

Example 3 may include the apparatus of example 2 and/or any other example disclosed herein, for which the photodetector may include a single photodiode or photomultiplier tube configured to detect the focused first portion of the light as the input signals.

Example 4 may include the apparatus of example 3 and/or any other example disclosed herein, further including a data acquisition device configured to convert the input signals from the photodetector into digital output signals. The testing device may be further configured to perform an FFT on the digital output signals, to obtain the measured signals.

Example 5 may include the apparatus of example 1 and/or any other example disclosed herein, for which the pattern on the mask may be configured to determine a minimum signal pitch incident on the mask, and a maximum number of signal channels passable through the mask.

Example 6 may include the apparatus of example 1 and/or any other example disclosed herein, for which the testing device may be further configured to subtract the obtained measured signals from the threshold signal, to obtain difference signals, based on at least one of the obtained difference signals being negative in value, determine that at least one of the measured signals corresponding to the at least one of the obtained difference signals is not a failure, and based on the at least one of the obtained difference signals being positive in value, determine that the at least one of the measured signals corresponding to the at least one of the obtained difference signals is a failure.

Example 7 may include the apparatus of example 1 and/or any other example disclosed herein, for which the testing device may be further configured to obtain a simulated signal from the obtained measured signals, using a reference channel corresponding to an input reference power, among the frequencies, and scale the obtained simulated signal by a peak at the reference channel, to obtain the threshold signal.

Example 8 provides a method including controlling a mask to spin at a frequency, the mask allowing a first portion of light incident on the mask to pass through the mask, and blocking a remaining portion of the light incident on the mask, based on a pattern on the mask, the light being carried and output by optical fiber channels input into optical fiber ports, and detecting, via a photodetector, the allowed first portion of the light as input signals. The method further includes transforming the input signals to a frequency domain, to obtain measured signals in frequencies respectively corresponding to the optical fiber channels, and determining whether each of the measured signals is a failure by comparing the obtained measured signals with a threshold signal.

Example 9 may include the method of example 8 and/or any other example disclosed herein, for which a focusing optic may focus the allowed first portion of the light onto the photodetector.

Example 10 may include the method of example 9 and/or any other example disclosed herein, for which the detecting the allowed first portion of the light may include detecting, via the photodetector, the focused first portion of the light as the input signals.

Example 11 may include the method of example 10 and/or any other example disclosed herein, further including converting the input signals from the photodetector into digital output signals. The transforming the input signals may include performing an FFT on the digital output signals, to obtain the measured signals.

Example 12 may include the method of example 8 and/or any other example disclosed herein, for which the pattern on the mask may be configured to determine a minimum signal pitch incident on the mask, and a maximum number of signal channels passable through the mask.

Example 13 may include the method of example 8 and/or any other example disclosed herein, for which the determining whether each of the measured signals is a failure may include subtracting the obtained measured signals from the threshold signal, to obtain difference signals, based on at least one of the obtained difference signals being negative in value, determining that at least one of the measured signals corresponding to the at least one of the obtained difference signals is not a failure, and based on the at least one of the obtained difference signals being positive in value, determining that the at least one of the measured signals corresponding to the at least one of the obtained difference signals is a failure.

Example 14 may include the method of example 8 and/or any other example disclosed herein, further including obtaining a simulated signal from the obtained measured signals, using a reference channel corresponding to an input reference power, among the frequencies, and scaling the obtained simulated signal by a peak at the reference channel, to obtain the threshold signal.

Example 15 provides a non-transitory computer-readable medium including instructions, which, if executed by a processor, cause the processor to control a mask to spin at a frequency, the mask allowing a first portion of light incident on the mask to pass through the mask, and blocking a remaining portion of the light incident on the mask, based on a pattern on the mask, the light being carried and output by optical fiber channels input into optical fiber ports, and detect, via a photodetector, the allowed first portion of the light as input signals. The instructions, which, if executed by the processor, further cause the processor to transform the input signals to a frequency domain, to obtain measured signals in frequencies respectively corresponding to the optical fiber channels, and determine whether each of the measured signals is a failure by comparing the obtained measured signals with a threshold signal.

Example 16 may include the non-transitory computer-readable medium of example 15 and/or any other example disclosed herein, for which a focusing optic may focus the allowed first portion of the light onto the photodetector.

Example 17 may include the non-transitory computer-readable medium of example 16 and/or any other example disclosed herein, for which the instructions, which, if executed by the processor, may further cause the processor to detect, via the photodetector, the focused first portion of the light as the input signals.

Example 18 may include the non-transitory computer-readable medium of example 17 and/or any other example disclosed herein, for which the instructions, which, if executed by the processor, may further cause the processor to convert the input signals from the photodetector into digital output signals, and perform an FFT on the digital output signals, to obtain the measured signals.

Example 19 may include the non-transitory computer-readable medium of example 15 and/or any other example disclosed herein, for which the instructions, which, if executed by the processor, may further cause the processor to subtract the obtained measured signals from the threshold signal, to obtain difference signals, based on at least one of the obtained difference signals being negative in value, determine that at least one of the measured signals corresponding to the at least one of the obtained difference signals is not a failure, and based on the at least one of the obtained difference signals being positive in value, determine that the at least one of the measured signals corresponding to the at least one of the obtained difference signals is a failure.

Example 20 may include the non-transitory computer-readable medium of example 15 and/or any other example disclosed herein, for which the instructions, which, if executed by the processor, further cause the processor to obtain a simulated signal from the obtained measured signals, using a reference channel corresponding to an input reference power, among the frequencies, and scale the obtained simulated signal by a peak at the reference channel, to obtain the threshold signal.

Example 21 provides an apparatus including controlling means for controlling a mask to spin at a frequency, the mask allowing a first portion of light incident on the mask to pass through the mask, and blocking a remaining portion of the light incident on the mask, based on a pattern on the mask, the light being carried and output by optical fiber channels input into optical fiber ports, and detecting means for detecting, via a photodetector, the allowed first portion of the light as input signals. The apparatus further includes transforming means for transforming the input signals to a frequency domain, to obtain measured signals in frequencies respectively corresponding to the optical fiber channels, and determining means for determining whether each of the measured signals is a failure by comparing the obtained measured signals with a threshold signal.

Example 22 may include the apparatus of example 21 and/or any other example disclosed herein, further including obtaining means for obtaining a simulated signal from the obtained measured signals, using a reference channel corresponding to an input reference power, among the frequencies, and scaling means for scaling the obtained simulated signal by a peak at the reference channel, to obtain the threshold signal.

It will be understood that any property described herein for a specific device may also hold for any device described herein. It will also be understood that any property described herein for a specific method may hold for any of the methods described herein. Furthermore, it will be understood that for any device or method described herein, not necessarily all the components or operations described will be enclosed in the device or method, but only some (but not all) components or operations may be enclosed.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

The term "coupled" (or "connected") herein may be understood as electrically coupled, as mechanically coupled, or as optically coupled, e.g., attached or fixed, or just in contact without any fixation, and it will be understood that both direct coupling or indirect coupling (in other words: coupling without direct contact) may be provided.

The methods described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g., a microprocessor. A "circuit" may also be software being implemented or executed by a processor, e.g., any kind of computer program, e.g., a computer program using a virtual machine code. Any other kind of implementation of the respective functions that are described herein may also be understood as a "circuit" in accordance with an alternative embodiment.

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. An apparatus comprising:
   optical fiber ports into which optical fiber channels are input, the optical fiber channels carrying and outputting light;
   a mask configured to, while spinning at a frequency, allow a first portion of the light incident on the mask to pass through the mask, and block a remaining portion of the light incident on the mask, based on a pattern on the mask;
   a photodetector configured to detect the allowed first portion of the light as input signals; and
   a testing device configured to:
   transform the input signals to a frequency domain, to obtain measured signals in frequencies respectively corresponding to the optical fiber channels; and
   determine whether each of the measured signals is a failure by comparing the obtained measured signals with a threshold signal.

2. The apparatus of claim 1, further comprising a focusing optic configured to focus the allowed first portion of the light onto the photodetector.

3. The apparatus of claim 2, wherein the photodetector comprises a single photodiode or photomultiplier tube configured to detect the focused first portion of the light as the input signals.

4. The apparatus of claim 3, further comprising a data acquisition device configured to convert the input signals from the photodetector into digital output signals,
   wherein the testing device is further configured to perform a fast Fourier transform on the digital output signals, to obtain the measured signals.

5. The apparatus of claim 1, wherein the pattern on the mask is configured to determine a minimum signal pitch incident on the mask, and a maximum number of signal channels passable through the mask.

6. The apparatus of claim 1, wherein the testing device is further configured to:
   subtract the obtained measured signals from the threshold signal, to obtain difference signals;
   based on at least one of the obtained difference signals being negative in value, determine that at least one of the measured signals corresponding to the at least one of the obtained difference signals is not a failure; and
   based on the at least one of the obtained difference signals being positive in value, determine that the at least one of the measured signals corresponding to the at least one of the obtained difference signals is a failure.

7. The apparatus of claim 1, wherein the testing device is further configured to:
   obtain a simulated signal from the obtained measured signals, using a reference channel corresponding to an input reference power, among the frequencies; and
   scale the obtained simulated signal by a peak at the reference channel, to obtain the threshold signal.

8. A method comprising:
   controlling a mask to spin at a frequency, the mask allowing a first portion of light incident on the mask to pass through the mask, and blocking a remaining portion of the light incident on the mask, based on a pattern on the mask, the light being carried and output by optical fiber channels input into optical fiber ports;
   detecting, via a photodetector, the allowed first portion of the light as input signals;
   transforming the input signals to a frequency domain, to obtain measured signals in frequencies respectively corresponding to the optical fiber channels; and
   determining whether each of the measured signals is a failure by comparing the obtained measured signals with a threshold signal.

9. The method of claim 8, wherein a focusing optic focuses the allowed first portion of the light onto the photodetector.

10. The method of claim 9, wherein the detecting the allowed first portion of the light comprises detecting, via the photodetector, the focused first portion of the light as the input signals.

11. The method of claim 10, further comprising converting the input signals from the photodetector into digital output signals,
    wherein the transforming the input signals comprises performing a fast Fourier transform on the digital output signals, to obtain the measured signals.

12. The method of claim 8, wherein the pattern on the mask is configured to determine a minimum signal pitch incident on the mask, and a maximum number of signal channels passable through the mask.

13. The method of claim 8, wherein the determining whether each of the measured signals is a failure comprises:
    subtracting the obtained measured signals from the threshold signal, to obtain difference signals;
    based on at least one of the obtained difference signals being negative in value, determining that at least one of the measured signals corresponding to the at least one of the obtained difference signals is not a failure; and
    based on the at least one of the obtained difference signals being positive in value, determining that the at least one of the measured signals corresponding to the at least one of the obtained difference signals is a failure.

14. The method of claim 8, further comprising:
    obtaining a simulated signal from the obtained measured signals, using a reference channel corresponding to an input reference power, among the frequencies; and
    scaling the obtained simulated signal by a peak at the reference channel, to obtain the threshold signal.

15. A non-transitory computer-readable medium comprising instructions, which, if executed by a processor, cause the processor to:
    control a mask to spin at a frequency, the mask allowing a first portion of light incident on the mask to pass through the mask, and blocking a remaining portion of the light incident on the mask, based on a pattern on the mask, the light being carried and output by optical fiber channels input into optical fiber ports;
    detect, via a photodetector, the allowed first portion of the light as input signals;
    transform the input signals to a frequency domain, to obtain measured signals in frequencies respectively corresponding to the optical fiber channels; and
    determine whether each of the measured signals is a failure by comparing the obtained measured signals with a threshold signal.

16. The non-transitory computer-readable medium of claim 15, wherein a focusing optic focuses the allowed first portion of the light onto the photodetector.

17. The non-transitory computer-readable medium of claim 16, wherein the instructions, which, if executed by the processor, further cause the processor to detect, via the photodetector, the focused first portion of the light as the input signals.

18. The non-transitory computer-readable medium of claim 17, wherein the instructions, which, if executed by the processor, further cause the processor to:
- convert the input signals from the photodetector into digital output signals; and
- perform a fast Fourier transform on the digital output signals, to obtain the measured signals.

19. The non-transitory computer-readable medium of claim 15, wherein the instructions, which, if executed by the processor, further cause the processor to:
- subtract the obtained measured signals from the threshold signal, to obtain difference signals;
- based on at least one of the obtained difference signals being negative in value, determine that at least one of the measured signals corresponding to the at least one of the obtained difference signals is not a failure; and
- based on the at least one of the obtained difference signals being positive in value, determine that the at least one of the measured signals corresponding to the at least one of the obtained difference signals is a failure.

20. The non-transitory computer-readable medium of claim 15, wherein the instructions, which, if executed by the processor, further cause the processor to:
- obtain a simulated signal from the obtained measured signals, using a reference channel corresponding to an input reference power, among the frequencies; and
- scale the obtained simulated signal by a peak at the reference channel, to obtain the threshold signal.

* * * * *